(12) United States Patent
Kanamarlapudi et al.

(10) Patent No.: US 10,218,484 B2
(45) Date of Patent: Feb. 26, 2019

(54) ENHANCED TRANSMISSION ACKNOWLEDGMENT DELIVERY AND PROCESSING

(71) Applicant: QUALCOMM Incorporated, San Diego, CA (US)

(72) Inventors: Sitaramanjaneyulu Kanamarlapudi, San Diego, CA (US); Aziz Gholmieh, Del Mar, CA (US); Liangchi Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/716,291

(22) Filed: Sep. 26, 2017

(65) Prior Publication Data

US 2018/0091278 A1 Mar. 29, 2018

Related U.S. Application Data

(60) Provisional application No. 62/400,308, filed on Sep. 27, 2016.

(51) Int. Cl.
*H04L 5/00* (2006.01)
*H04L 29/06* (2006.01)
(Continued)

(52) U.S. Cl.
CPC .......... *H04L 5/0055* (2013.01); *H04L 1/1664* (2013.01); *H04L 1/1685* (2013.01);
(Continued)

(58) Field of Classification Search
None
See application file for complete search history.

(56) References Cited

U.S. PATENT DOCUMENTS 8,599,734 B1 12/2013 Ram et al.
9,491,269 B2 * 11/2016 Karri ..................... H04L 69/324
(Continued)

FOREIGN PATENT DOCUMENTS

EP 2698002 A2 2/2014
WO WO-2016093756 A1 6/2016

OTHER PUBLICATIONS

3rd Generation Partnership Project; Technical Specification Group Radio Access Network; Study on Scenarios and Requirements for Next Generation Access Technologies; (Release 14), 3GPP Standard; 3rd Generation Partnership Project (3GPP), 650 Route des Lucioles—Sophia Antipolis, Valbonne—France, 3GPP TR 38.913, No. V0.4.0; Jun. 2016 (Jun. 2016), pp. 1-35.

(Continued)

*Primary Examiner* — Eunsook Choi
(74) *Attorney, Agent, or Firm* — Norton Rose Fulbright LLP

(57) ABSTRACT

Systems and methods adapted to provide transmission of communication acknowledgments to facilitate effective delivery and processing of acknowledgments are disclosed. Embodiments may utilize one or more special definition of header and/or control bits (e.g., length indicator, extension field, etc.), special grants (e.g., a grant to carry control PDUs and/or data PDUs with one or more ACKs), and/or one or more special logical channel/radio bearer (e.g., a logical channel having higher priority than regular data bearer traffic) for delivery of acknowledgments, to expedite processing of the acknowledgments, etc. A device receiving such acknowledgments may identify a packet as including one or more acknowledgment upon decoding/deciphering the received packet, such as by detecting a header field containing special data or by receiving the acknowledgment via a special bearer channel, whereby the acknowledgments may be extracted and delivered to upper layers without (Continued)

waiting for all the in-sequence packets to be received or processed.

30 Claims, 9 Drawing Sheets

(51) Int. Cl.
H04L 29/08 (2006.01)
H04L 1/16 (2006.01)
H04L 1/18 (2006.01)
H04W 28/02 (2009.01)
H04W 76/10 (2018.01)
H04W 28/26 (2009.01)
H04W 72/14 (2009.01)

(52) U.S. Cl.
CPC .......... *H04L 1/1854* (2013.01); *H04L 1/1864* (2013.01); *H04L 1/1874* (2013.01); *H04L 69/22* (2013.01); *H04L 69/324* (2013.01); *H04W 28/0273* (2013.01); *H04W 28/26* (2013.01); *H04W 72/14* (2013.01); *H04W 76/10* (2018.02)

(56) References Cited

U.S. PATENT DOCUMENTS

| 9,661,657 | B2 | 5/2017 | Yu et al. |
| 2007/0291646 | A1* | 12/2007 | Ohishi ............... H04L 1/1678 370/236 |
| 2011/0103379 | A1 | 5/2011 | Kim et al. |
| 2015/0117371 | A1* | 4/2015 | Sundberg ......... H04W 72/1289 370/329 |
| 2016/0073449 | A1 | 3/2016 | Pang et al. |
| 2017/0214489 | A1 | 7/2017 | Jiang et al. |

OTHER PUBLICATIONS

Partial International Search Report—PCT/US2017/053626—ISA/EPO—dated Dec. 12, 2017.

* cited by examiner

ENHANCED TRANSMISSION ACKNOWLEDGMENT DELIVERY AND PROCESSING

CROSS-REFERENCE TO RELATED APPLICATION

This application claims the benefit of U.S. Provisional Patent Application No. 62/400,308, entitled, "ENHANCED TRANSMISSION ACKNOWLEDGEMENT DELIVERY AND PROCESSING," filed on Sep. 27, 2016, the disclosure of which is hereby incorporated by reference herein in its entirety as if fully set forth below and for all applicable purposes.

TECHNICAL FIELD

Aspects of the present disclosure relate generally to communication systems, and more particularly, to communication of transmission acknowledgements. Certain embodiments of the technology discussed below can enable and provide effective delivery and processing of communication acknowledgments.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the universal mobile telecommunication system (UMTS) technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for providing communication acknowledgments (ACKs) between a plurality of communication devices is provided. The method includes receiving, by a first communication device of the plurality of communication devices, a data packet. The data packet can comprise a data packet of a sequence of data packets. In other words, the received data packet may be contained in a sequence of a plurality of received data packets. The method further includes determining, by the first communication device from radio link control (RLC) layer information of the data packet, if the data packet comprises at least one ACK of an upper layer data protocol in a payload portion of the data packet. The method can also include extracting, by the first communication device, the at least one ACK from the data packet. And the method may also include delivering the extracted ACK to communication control logic of the first communication device out of order with respect to the sequence of data packets.

In a further aspect of the disclosure, an apparatus for providing communication acknowledgments (ACKs) between a plurality of communication devices is provided. The apparatus includes means for receiving, by a first communication device of the plurality of communication devices, a data packet. The data packet can comprise a data packet of a sequence of data packets. In other words, the received data packet may be contained in a sequence of a plurality of received data packets. The apparatus further includes means for determining from radio link control (RLC) layer information of the data packet if the data packet comprises at least one ACK of an upper layer data protocol in a payload portion of the data packet. The apparatus can also include means for extracting the at least one ACK from the data packet. And the apparatus can also include means for delivering the extracted ACK to communication control logic of the first communication device out of order with respect to the sequence of data packets.

In a still further aspect of the disclosure, a non-transitory computer-readable medium having program code recorded thereon for providing communication acknowledgments (ACKs) between a plurality of communication devices is provided. The program code includes program code for causing one or more computers to receive, at a first communication device of the plurality of communication devices, a data packet. The data packet can comprise a data packet of a sequence of data packets. In other words, the received data packet may be contained in a sequence of a plurality of received data packets. The program code further includes program code for causing one or more computers to determine if the data packet comprises at least one ACK of an upper layer data protocol in a payload portion of the data packet from radio link control (RLC) layer information of the data packet. The program code can also include program code for causing one or more computers to extract the at least one ACK from the data packet. And the program code can also include program code for causing one or more computers to deliver the extracted ACK to communication control logic of the first communication device out of order with respect to the sequence of data packets.

In a yet further aspect of the disclosure, an apparatus for providing communication acknowledgments (ACKs) between a plurality of communication devices is provided. The apparatus includes at least one processor and a memory coupled to the at least one processor. The at least one processor is configured to receive, at a first communication device of the plurality of communication devices, a data packet. The data packet can comprise a data packet of a sequence of data packets. In other words, the received data packet may be contained in a sequence of a plurality of received data packets. The at least one processor is further configured to determine if the data packet comprises at least one ACK of an upper layer data protocol in a payload portion of the data packet from radio link control (RLC) layer information of the data packet. The at least one processor may also be configured to extract the at least one ACK from the data packet. And the at least one processor may also be configured to deliver the extracted ACK to communication control logic of the first communication device out of order with respect to the sequence of data packets.

In one aspect of the disclosure, a method for providing communication acknowledgments (ACKs) between a plurality of communication devices is provided. The method includes providing, by a first communication device of the plurality of communication devices, at least one ACK of an upper layer data protocol for including in a payload portion of a data packet and generating, by the first communication device, the data packet including the at least one ACK and configured to indicate inclusion of the at least one ACK at a radio link control (RLC) layer. The method further includes transmitting, by the first communication device, the data packet, wherein the data packet comprises a data packet of a sequence of data packets.

In a further aspect of the disclosure, an apparatus for providing communication acknowledgments (ACKs) between a plurality of communication devices is provided. The apparatus includes means for providing, at a first communication device of the plurality of communication devices, at least one ACK of an upper layer data protocol for including in a payload portion of a data packet and means for generating, at the first communication device, the data packet including the at least one ACK and configured to indicate inclusion of the at least one ACK at a radio link control (RLC) layer. The apparatus further includes means for transmitting the data packet, wherein the data packet comprises a data packet of a sequence of data packets.

In a still further aspect of the disclosure, a non-transitory computer-readable medium having program code recorded thereon for providing communication acknowledgments (ACKs) between a plurality of communication devices is provided. The program code includes program code for causing one or more computers to provide, at a first communication device of the plurality of communication devices, at least one ACK of an upper layer data protocol for including in a payload portion of a data packet and generate, at the first communication device, the data packet including the at least one ACK and configured to indicate inclusion of the at least one ACK at a radio link control (RLC) layer. The program code further includes program code for causing one or more computers to transmit the data packet, wherein the data packet comprises a data packet of a sequence of data packets.

In a yet further aspect of the disclosure, an apparatus for providing communication acknowledgments (ACKs) between a plurality of communication devices is provided. The apparatus includes at least one processor and a memory coupled to the at least one processor. The at least one processor is configured to provide, at a first communication device of the plurality of communication devices, at least one ACK of an upper layer data protocol for including in a payload portion of a data packet and to generate, at the first communication device, the data packet including the at least one ACK and configured to indicate inclusion of the at least one ACK at a radio link control (RLC) layer. The at least one processor is further configured to transmit the data packet, wherein the data packet comprises a data packet of a sequence of data packets.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
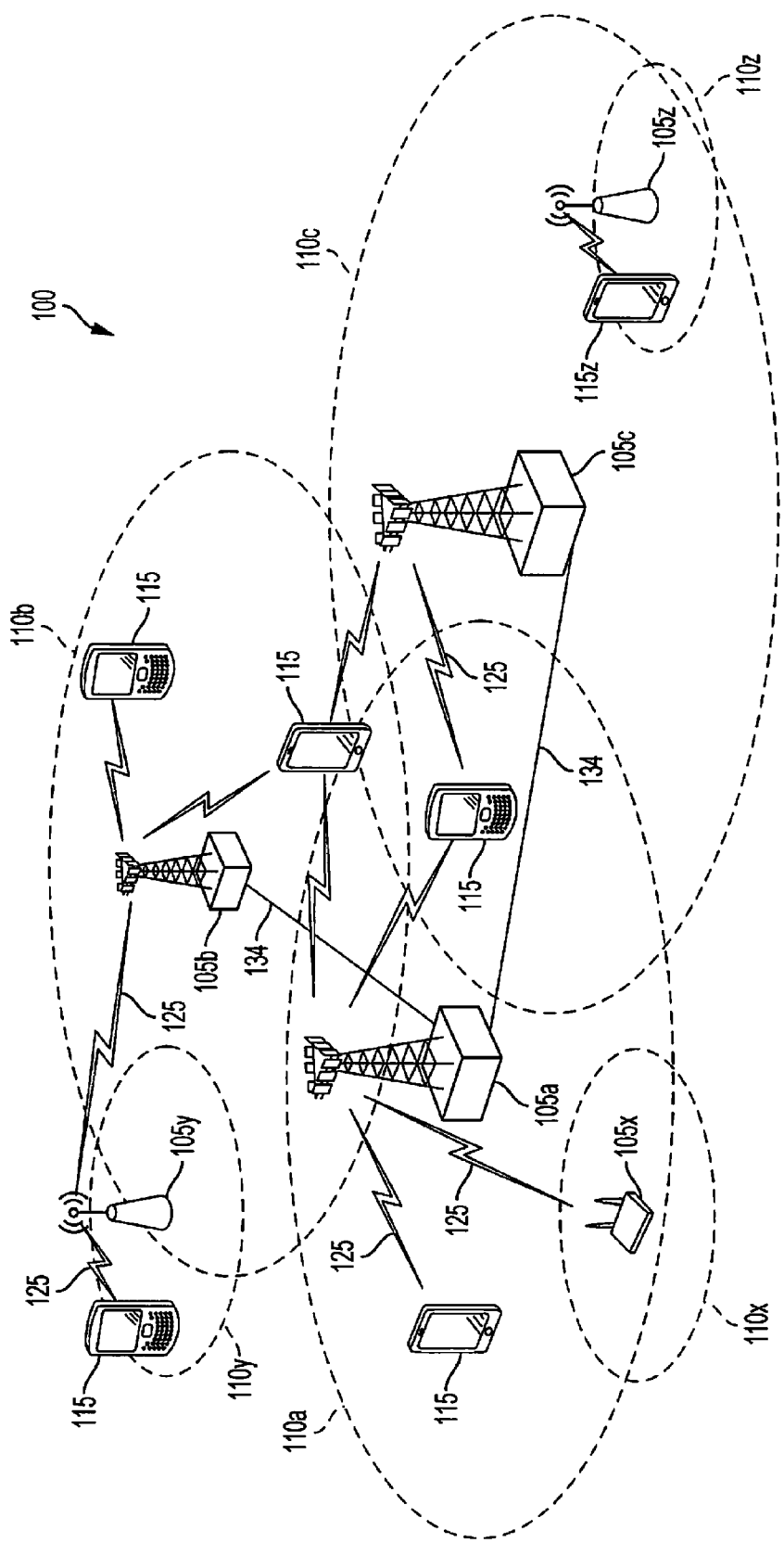
FIG. 1 is a block diagram illustrating details of a wireless communication system according to some embodiments.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network may, for example, implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (gNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
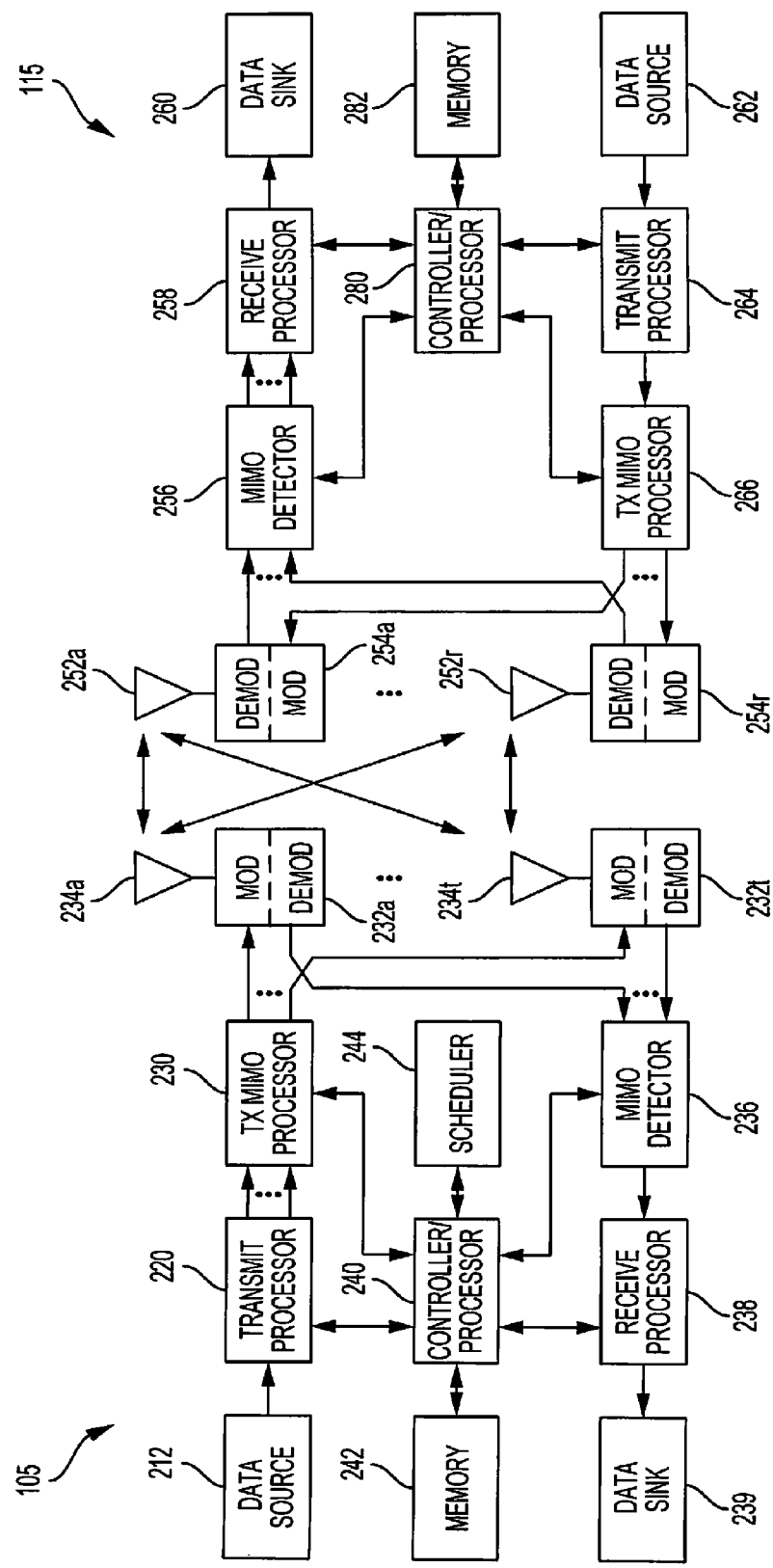
FIG. 2 is a block diagram conceptually illustrating a design of a base station/gNB and a UE configured according to one aspect of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and UE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical control format indicator channel (PCFICH), physical hybrid-ARQ indicator channel) PHICH, physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS), secondary synchronization signal (SSS), and cell-specific reference signal (CRS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 8 and 9, and/or other processes for the techniques described herein. Memories 242 and 282 may store data and program codes for gNB 105 and UE 115, respectively. Scheduler 244 may schedule UEs for data transmission on the downlink and/or uplink.

Increased data rates in the uplink and downlink, with reduced latency requirements, are proposed for the next generation of wireless communication network currently under development, referred to as 5G. In particular, Technical Report (TR) 38.913 (3GPP TR 38.913 ver. 0.4.0 dated Aug. 28, 2017) issued by the 3GPP standards body defines a target for peak data rate of 20 Gbps for the downlink and 10 Gbps for the uplink, as well as defines a target for user plane latency for enhanced mobile broadband (eMBB) of 4 ms for the uplink and 4 ms for the downlink. With such increased data rates, it becomes important to implement high performance architectures, such as to move most of the microprocessor without interlocked pipeline stages (MIPS) and other processor intensive activity close to hardware acceleration. Additionally, many proposals regarding reducing the latency as well as increasing the throughput utilize various techniques to encode/decode and process the data protocol data units (PDUs).

Some of the proposals, for example, involve dealing with the traffic based on flow information and type of data. In a somewhat typical scenario, a network device (e.g., base station) may be sending transmission control protocol (TCP) data at very high rate to another network device (e.g., UE) in the downlink with a good amount of scheduling (e.g., scheduling sufficient to accommodate transmission of data meeting a data rate target, such as may be defined by an applicable communication standard, service level agreement, etc.), wherein the UE is also conducting a data flow in the uplink such that TCP acknowledgments (ACKs) in the uplink corresponding to downlink TCP data are delayed due to various queues in the data pipe. In this situation, the downlink data transmission will be slowed, despite there being sufficient downlink bandwidth and scheduling (e.g., meeting a predetermined data rate target), because the TCP flow and window (e.g., congestion window) management depends on the timely reception of the TCP ACKs. Accordingly, some proposed techniques prioritize the TCP ACK in the internal queues (e.g., operate to push the TCP ACKs to the front of the queue (Watermark) while there is other data pending to transmit in the queue) in an effort to improve the TCP ACK transmission in the uplink. Such techniques, however, are only useful to prioritize the TCP ACK among the data in pipe, but do nothing to ensure effective delivery and processing of the ACKs.

Figure 3:
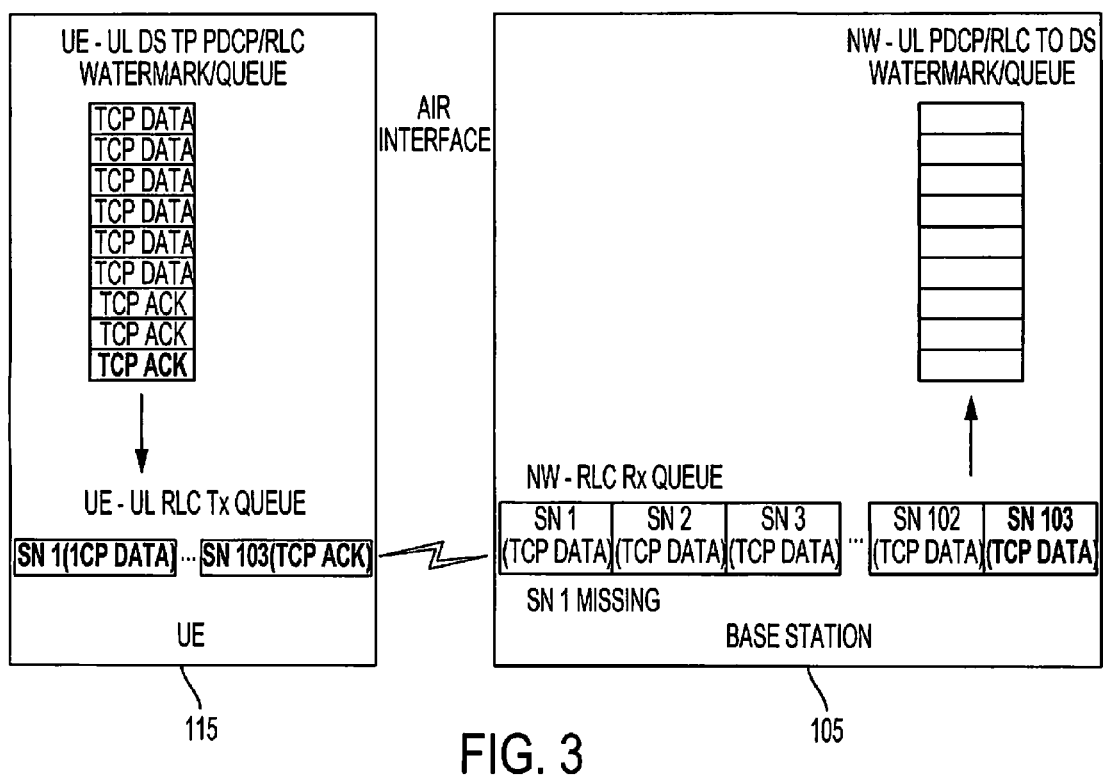
FIG. 3 illustrates prioritization of acknowledgments for transmission with respect to a bidirectional communication link between a plurality of communication devices according to some concepts of the present disclosure.

FIG. 3 illustrates an example of operation wherein gNB 105 is in bidirectional communication with UE 115. In the example of FIG. 3, it is assumed that gNB 105 is transmitting TCP data in the downlink with a good amount of scheduling (e.g., scheduling sufficient to accommodate transmission of data meeting a data rate target, such as may be defined by an applicable communication standard, service level agreement, etc.) and UE 115 is sending TCP data in the uplink. As can be seen in the illustrated data queue, UE 115 is operating to prioritize the TCP ACKs in an uplink watermark over the TCP data before encoding into packet data convergence protocol (PDCP) PDUs. However, some level of hybrid automatic repeat request (HARQ) block error rate (BLER) or radio link control (RLC) BLER is present in the uplink in the illustrated example. Accordingly, although many PDUs are transmitted in sequence from UE 115 to gNB 105, some of the PDUs are lost and holes are present at the network side RLC level. A RLC acknowledgment mode (AM) entity of gNB 105 may operate to process the received PDUs in-sequence and deliver the processed PDUs to the data layer. However, in typical TCP operation, the received PDUs are not processed until all the holes are filled and in-sequence. For example, delay is experienced due to BLER where retransmissions are needed, wherein the delay is increased with large BLER and less transmission grants.

Moreover, in typical TCP operation, RLC control and retransmission PDUs have higher priority than new PDUs in which the TCP ACKs are transmitted according to an ACK prioritization technique as illustrated in FIG. 3. Accordingly, TCP ACKs may be delayed from a RLC queue of gNB 105 to the data layer for multiple reasons, such as due to BLER at physical (PHY)/media access control (MAC)/RLC level resulting in PDUs to be retransmitted (introducing round trip time (RTT) delays for each retransmission) and processed in-sequence. When the UE is power limited or grant limited, if there are multiple already prepared PDUs to be transmitted or multiple retransmission PDUs are pending, then even the TCP ACK at the watermark/queue beginning will take appreciably more time.

Even in the case of no BLER, TCP ACKs transmitted according to an ACK prioritization technique as illustrated in FIG. 3 will be processed in-sequence at the RLC level. Accordingly, if there are multiple PDUs ahead of the received TCP ACK for processing, such as due to software/hardware processing logic and latency, only when all the PDUs before the TCP ACK (e.g., sequence number (SN) 1 to SN 102) are processed will the TCP ACK PDU (e.g., SN 103) be processed and delivered to the data layer. With increased data rates and large payloads, such as proposed for 5G networks, the MIPS requirement is very high to process the regular data PDUs, which may delay the TCP ACK processing.

Due to the aforementioned in-sequence delivery requirement, even though the TCP ACKs may be prioritized for transmission over data in the uplink by UE 115 using an ACK prioritization technique as illustrated in FIG. 3, the TCP ACKs will not be processed and delivered at receiver (gNB 105) until all the PDU holes are filled and in-sequence at the receiver. This operation results in TCP downlink traffic from gNB 105 to UE 115 being slowed (i.e., the uplink ACKs control the downlink data, and vice versa), even where downlink bandwidth remains available for the downlink traffic. Accordingly, techniques to prioritize TCP ACKs in the internal queues/pipeline by deep inspection of the TCP traffic (e.g., as illustrated in the example of FIG. 3) may help to avoid delays due to deep queues, but are not able to address the radio level issues, such as BLER and in-sequence delivery, because all of the TCP data and ACKs are part of RLC data PDUs and processed accordingly by the receiver (gNB 105 in the example of FIG. 3).

Embodiments in accordance with concepts of the present disclosure are operable to provide transmission of ACKs to facilitate effective delivery and processing of communication acknowledgments. In operation according to embodiments, ACKs of an upper layer data protocol (e.g., TCP ACKs) provided in accordance with concepts therein are detectable in the RLC layer so that it is not necessary to wait for reordering of packets before delivery of ACKs to upper layers. For example, some embodiments herein may utilize one or more special (e.g., reserved or predefined) definitions of header and/or control bits (e.g., length indicator, extension field, etc.) to signal transmission of one or more ACKs for indicating delivery of acknowledgments, to expedite processing of the acknowledgments, etc. Additionally or alternatively, embodiments may utilize special (e.g., reserved or special/limited purpose) grants (e.g., a grant to carry PDUs, such as control PDUs and/or data PDUs, with one or more TCP ACKs) for delivery of acknowledgments, to expedite processing of the acknowledgments, etc. Further embodiments may additionally or alternatively utilize one or more special (e.g., reserved or special/limited purpose) logical channel/radio bearer (e.g., a logical channel having higher priority than regular data bearer traffic) for delivery of acknowledgments, to expedite processing of the acknowledgments, etc. It should be appreciated that combinations of the foregoing embodiments may be utilized in some implementations, such as to utilize one or more special definition of header and/or control bits with special grants. Moreover, any or all of the foregoing embodiments may be utilized in some implementations in combination with other ACK transmission and/or delivery techniques, such as an ACK prioritization technique (e.g., as discussed with reference to FIG. 3 above).

Operation according to the aforementioned embodiments reduces the delay in processing the received acknowledgments (e.g., TCP ACK) at receiver and enables improvements to the data flow. Moreover, such operation can significantly increase the performance when fading is specific to one direction or momentary. For example, the effective delivery and processing of ACKs according to embodiments of the present disclosure are particularly useful when UE goes through power limited or grant limited scenarios and TCP ACKs are behind many PDUs in the radio queue either due to new transmission or retransmissions.

Figure 4:
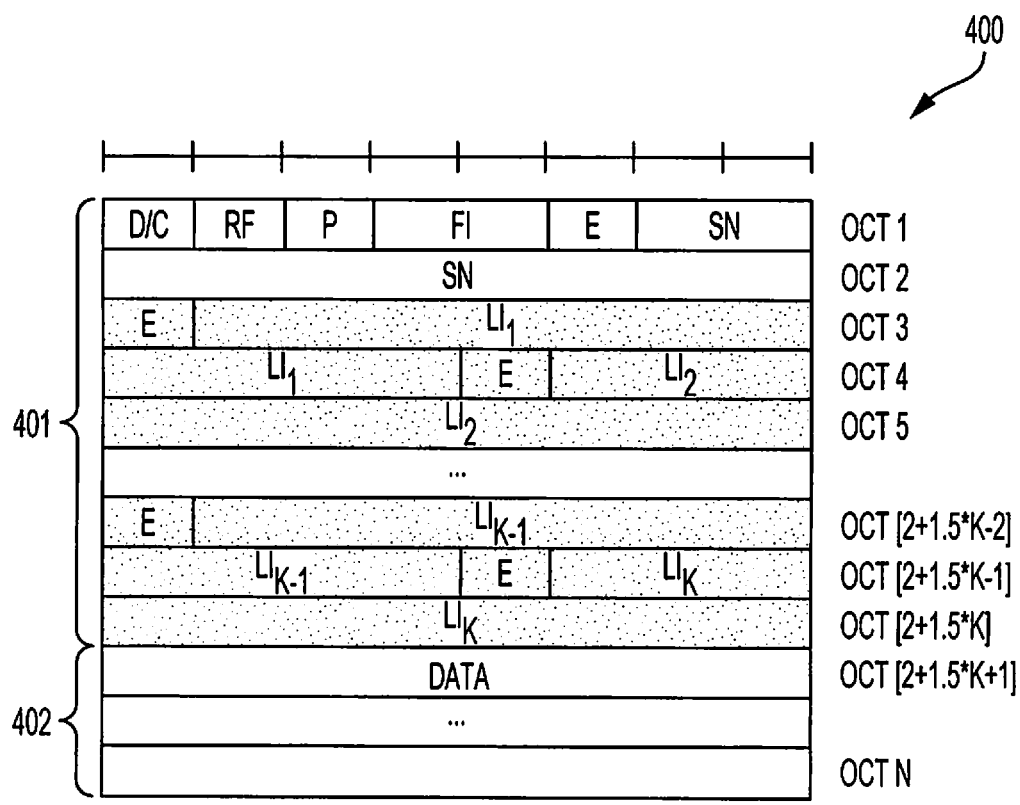
FIGS. 4 and 5 illustrate data packets adaptable with a special definition of header or control bits used to signal transmission of one or more acknowledgments according to concepts of the present disclosure.

FIG. 4 illustrates an exemplary embodiment configured to provide ACKs of an upper layer data protocol detectable in the RLC layer in which a special definition of header or control bits is used to signal transmission of one or more ACKs according to concepts of the present disclosure. In particular, FIG. 4 shows RLC data PDU 400 (e.g., as may comprise an AM data (AMD) PDU) having PDU header 401 having a plurality of header fields and PDU data 402 having one or more data fields. PDU header 401 may, for example, comprise a fixed part (i.e., fields that are present for every PDU) and an extension part (i.e., fields that are present for a PDU when necessary). The fixed part of such a PDU header may be byte aligned and may comprise a control or data (D/C) indicator field, a type or re-segmentation flag indicator (RF) field, a status report or polling bit indicator (P) field, a relative location indicator (FI) field, an extension (E) field, and a sequence number (SN) field. The extension part of such a PDU header may also be byte aligned and may comprise one or more extension fields and one or more length indicator (LI) fields. Generally, a PDU header comprises an extension part only when more than one data field elements are present in the PDU data, in which case an E and a LI are typically present for every data field element except the last. A length of the LI field is typically 11 bits for RLC UM and 11 bits or 15 bits for RLC AM, wherein the length of the LI field for RLC AM is configured by upper layers. For example, when a PDU header comprises an odd number of LI(s) and the length of the LI field may be 11 bits, four padding bits follow after the last LI.

The PDU of the embodiment of FIG. 4 is adapted according to concepts herein to provide a special definition of a length indicator (LI) for indicating delivery of acknowledgments and/or to expedite processing of the acknowledgments. A LI field of the PDU header, as used currently in communications networks, indicates the length in bytes of a corresponding data field of the PDU data present in the RLC data PDU delivered/received by an unacknowledged mode (UM) or AM RLC entity. For example, the first LI field (e.g., $LI_1$) present in PDU header 401 may correspond to the first data field present in PDU data 402 of RLC data PDU 400, the second LI field (e.g., $LI_2$) present in PDU header 401 may correspond to the second data field present in PDU data 402 of RLC data PDU 400, and so on. In current use of such LI fields, the only reserved value of LI is LI=0 for use with respect to the situation where the last segment of a service data unit (SDU) exactly ends at the end of a PDU.

In accordance with some embodiments herein, one or more reserved value of LI is provided for use with respect to the transmission and processing of acknowledgements, such as TCP ACKs. Such LI values may, for example, be reserved from the maximum end of the LI value to indicate transmission of an ACK as payload.

In operation according to an exemplary embodiment, one or more special reserved LI value may be used with respect to a single TCP ACK transmitted in one PDU. Using an example where the ACK is transmitted in the uplink, controller/processor 280 of UE 115 may operate to include a special LI value (e.g., FFF) in a LI field of PDU 400 and include a TCP ACK SDU in PDU data 402. The complete TCP ACK SDU may, for example, be included in PDU 400 with the last byte of TCP ACK being the last byte of PDU data 402. For example, in a RLC PDU format, the last LI field (e.g., $LI_K$) may be a special LI value of an embodiment herein to indicate a TCP ACK ending in the PDU, and correspondingly the framing information (FI) field may be "00" or "10" based on first SDU in the PDU. The reserved LI value utilized according to some such embodiments may indicate only the presence of the ACK, but not the actual length of the ACK, and thus a single ACK may be included in the PDU.

In operation according to another exemplary embodiment, one or more special reserved LI value may be used with respect to multiple TCP ACKs transmitted in one PDU. Using the example again where the ACK is transmitted in the uplink, controller/processor 280 of UE 115 may operate to include a special LI value (e.g., FFF) in one LI field of PDU 400, include the length of the TCP ACK in another LI field of PDU 400, and include a TCP ACK SDU in a data field of PDU data 402. In such an implementation, each instance of a TCP ACK SDU transmitted in the PDU may utilize multiple (e.g., 2) LIs in the PDU, wherein one LI indicates the presence of the TCP ACK and the other LI indicates the length of the TCP ACK. For example, in a RLC PDU format, a first LI field (e.g., any of $LI_1$ through $LI_{K-1}$) may be a special LI value of an embodiment herein to indicate a TCP ACK and a second LI (e.g., a next subsequent one of $LI_2$ through $LI_K$) may be a length value to indicate the actual length of the TCP ACK, wherein the TCP ACK may be included in a data field of PDU data 402 corresponding to the foregoing first and/or second mentioned LI field. Accordingly, multiple TCP ACKs may be encoded in a single PDU according to embodiments herein.

Using such special definitions of a LI, controller/processor 240 of gNB 105 may analyze the headers of received PDUs to detect the presence of a reserved LI field value indicating transmission of an ACK as payload. Accordingly, the special definitions of a LI of embodiments operate to indicate delivery of acknowledgments and/or to facilitate expedited processing of the acknowledgments, whereby the device receiving the PDU containing the ACK may proceed to process the PDU and its payload ACK out of sequence and without waiting until all holes are filled.

Figure 5:
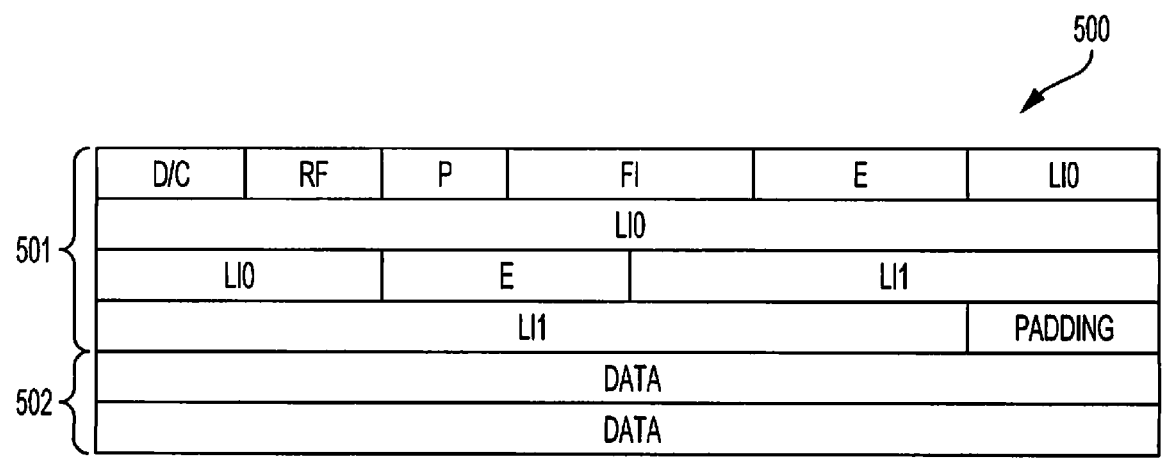

FIG. 5 illustrates another exemplary embodiment configured to provide ACKs of an upper layer data protocol detectable in the RLC layer in which a special definition of header or control bits is used to signal transmission of one or more ACKs according to concepts of the present disclosure. Similar to FIG. 4 discussed above, FIG. 5 shows RLC data PDU 500 having PDU header 501 having a plurality of header fields and PDU data 502 having one or more data fields. However, the embodiment of FIG. 5 provides a special definition of an extension parameter (E) for indicating delivery of acknowledgments and/or to expedite processing of the acknowledgments.

An extension field of the PDU header, as used currently in communications networks, indicates whether this field is the end of the header or another extension follows or not, wherein a length of the extension field is 1 bit. For example, in current communication networks, an extension field value of 0 indicates a data field follows, whereas an extension field value of 1 indicates a set of extension field and LI field follows.

In accordance with some embodiments herein, the aforementioned extension field is increased to a multiple bit field (e.g., 2 bits), wherein one or more reserved value of the extension value is provided for use with respect to the transmission and processing of acknowledgements, such as TCP ACKs. For example, in an embodiment providing for an extension field of two bits may provide a reserved value for indicating a TCP ACK included in the PDU payload. The reserved extension field value may, for example, indicate a TCP ACK LI, thus providing an indication of a TCP ACK. Using the example again where the ACK is transmitted in the uplink, controller/processor 280 of UE 115 may operate to include a reserved extension field value (e.g. 10), followed by a LI value to indicate the length of the TCP ACK SDU in the PDU.

Using such special definitions of an extension value, controller/processor 240 of gNB 105 may analyze the headers of received PDUs to detect the presence of a reserved extension field value indicating transmission of an ACK as payload. Accordingly, the special definitions of an extension value of embodiments operate to indicate delivery of acknowledgments and/or to facilitate expedited processing of the acknowledgments, whereby the device receiving the PDU containing the ACK may proceed to process the PDU and its payload ACK out of sequence and without waiting until all holes are filled.

Figure 6:
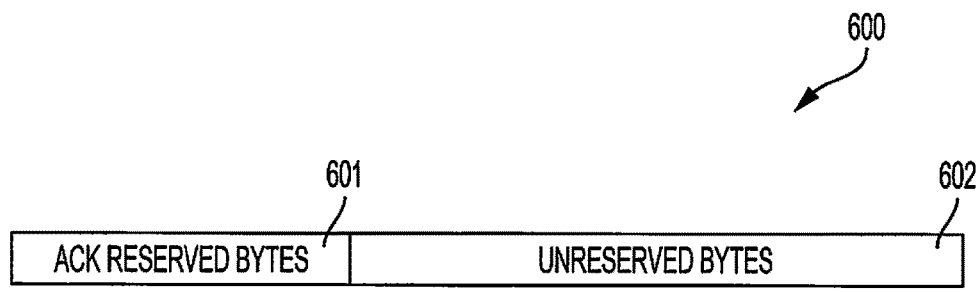
FIG. 6 illustrates the use of special grants with respect to acknowledgments according to concepts of the present disclosure.

FIG. 6 illustrates an exemplary embodiment configured to provide ACKs of an upper layer data protocol detectable in the RLC layer in which special grants are utilized with respect to TCP ACKs according to concepts of the present disclosure. In accordance with some embodiments, the network may operate to provision communication devices with special grants grant to deliver PDUs (e.g., control PDUs and/or data PDUs) with TCP ACKs (e.g., one or more TCP ACKs in the payload). For example, scheduler 244 of gNB 105 may operate to issue a special grant to UE 115 to carry the PDUs with TCP ACKs. The special grant may, for example, reserve some portion of the grant bytes for transmission of PDUs with TCP ACKs, whereby the reserved portion of the grant may be utilized for TCP ACK transmission irrespective of other data (e.g., new data transmissions, retransmissions of data, etc.) queued for transmission by the UE. Embodiments operable to utilize specialized grants may, for example, indicate some reserved grant out of the total grant for the TCP ACKs to provide the TCP ACKs with higher priority within the grant irrespective of other multiplexing rules, such as to cover the case where priority of logical channels or other criteria is not to delay the TCP ACK.

In accordance with the foregoing, special grant 600 is shown in the embodiment of FIG. 6, wherein the grant provides ACK reserved bytes 601 for the transmission of ACKs, if queued or otherwise needed at the UE, and unreserved bytes 602 for transmission of other data by the UE. In operation according to embodiments, where a special grant is made for a particular number of bytes (e.g., 1000 bytes), some portion of the grant bytes (e.g., 200 bytes) may be reserved for TCP ACK transmission, for example, and the remaining portion of the remaining grant bytes (e.g., 800 bytes) may be available for transmission of other data. Accordingly, ACK PDU transmissions up to the amount of ACK reserved portion of bytes (e.g., 200 bytes) may be made under the special grant, even where more than the remaining unreserved portion of grant bytes (e.g., 800 bytes)

of retransmission data (i.e., data conventionally given transmission priority over all other data transmission) is present at the UE.

Using such special grants, timely delivery of ACKs may be facilitated between communication devices (e.g., UE 115 and gNB 105). In operation according to embodiments, controller/processor 280 (e.g., using RLC level logic) of UE 115 may operate to indicate the transmission of ACKs and/or controller/processor 240 (e.g., using RLC level logic) of gNB 105 may analyze the packets to detect delivery of ACKs. Embodiments may additionally or alternatively utilize one or more special or reserved header bits (e.g., special bits such as the aforementioned control bits, extension bits, and LI bits) to indicate/detect ACKs at the MAC level. For example, controller/processor 240 of gNB 105 may analyze the headers of ACK PDUs received under a special grant to detect the presence of a reserved bit value indicating transmission of an ACK as payload. Accordingly, embodiments utilizing special grants may operate to indicate delivery of acknowledgments and/or to facilitate expedited processing of the acknowledgments, whereby the device receiving the PDU containing the ACK may proceed to process the PDU and its payload ACK out of sequence and without waiting until all holes are filled.

Figure 7:
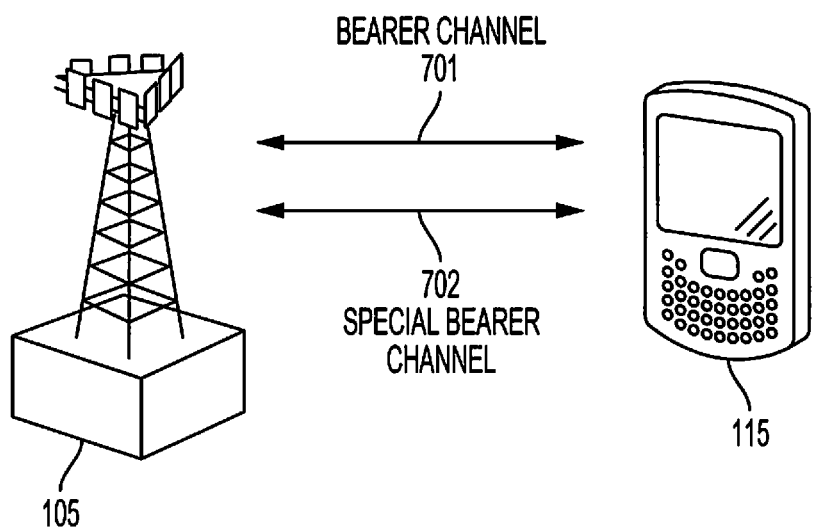
FIG. 7 illustrates the use of one or more special logical channel/radio bearer for delivery of acknowledgments according to concepts of the present disclosure.

FIG. 7 illustrates an exemplary embodiment configured to provide ACKs of an upper layer data protocol detectable in the RLC layer in which one or more special logical channel/radio bearer is utilized for delivery of TCP ACKs according to concepts of the present disclosure. In accordance with some embodiments, the network may operate to provision a logical channel or a radio bearer having higher priority than regular data bearer traffic to carry TCP ACKs. For example, controller/processor 240 of gNB 105 and controller/processor 280 of UE 115 may cooperate to establish special bearer channel 702 for transmission of TCP ACKs between the communication devices, in addition to bearer channel(s) 701 established between gNB 105 and UE 115 for carrying data bearer traffic. Scheduler 244 of gNB 105 may operate to issue a special grant to UE 115 to carry the PDUs with TCP ACKs. In operation according to embodiments, ACKs transmitted using special bearer channel 702, having a higher priority than bearer channel(s) 701, are communicated with higher priority and thus more likely to be communicated to the receiving device (e.g., gNB 105 in the foregoing example where the ACK is transmitted in the uplink).

Using such special bearer channels, timely delivery of ACKs may be facilitated between communication devices (e.g., UE 115 and gNB 105). Moreover, in embodiments where such a special bearer channel is utilized exclusively for communication of ACKs, receipt of a PDU via the special bearer channel may be identified as receipt of one or more ACKs, whereby the device receiving the PDU containing the ACK may proceed to process the PDU and its payload ACK. Where a special bearer channel is utilized for communication of data or information (e.g., such as control information to be provided priority over typical bearer traffic or priority data for quality of service or other considerations) in addition to ACKs, embodiments may utilize the aforementioned one or more special definition of header and/or control bits, such as the aforementioned reserved value of LI and/or extension value, with special bearer channels of embodiments to facilitate detection of received ACKs by a device. For example, controller/processor 240 of gNB 105 may analyze the headers of ACK PDUs received via a special bearer channel to detect the presence of a reserved LI value and/or a reserved extension field value indicating transmission of an ACK as payload. Accordingly, embodiments utilizing special bearer channels may operate to indicate delivery of acknowledgments and/or to facilitate expedited processing of the acknowledgments, whereby the device receiving the PDU containing the ACK may proceed to process the PDU and its payload ACK out of sequence and without waiting until all holes are filled.

Figure 8:
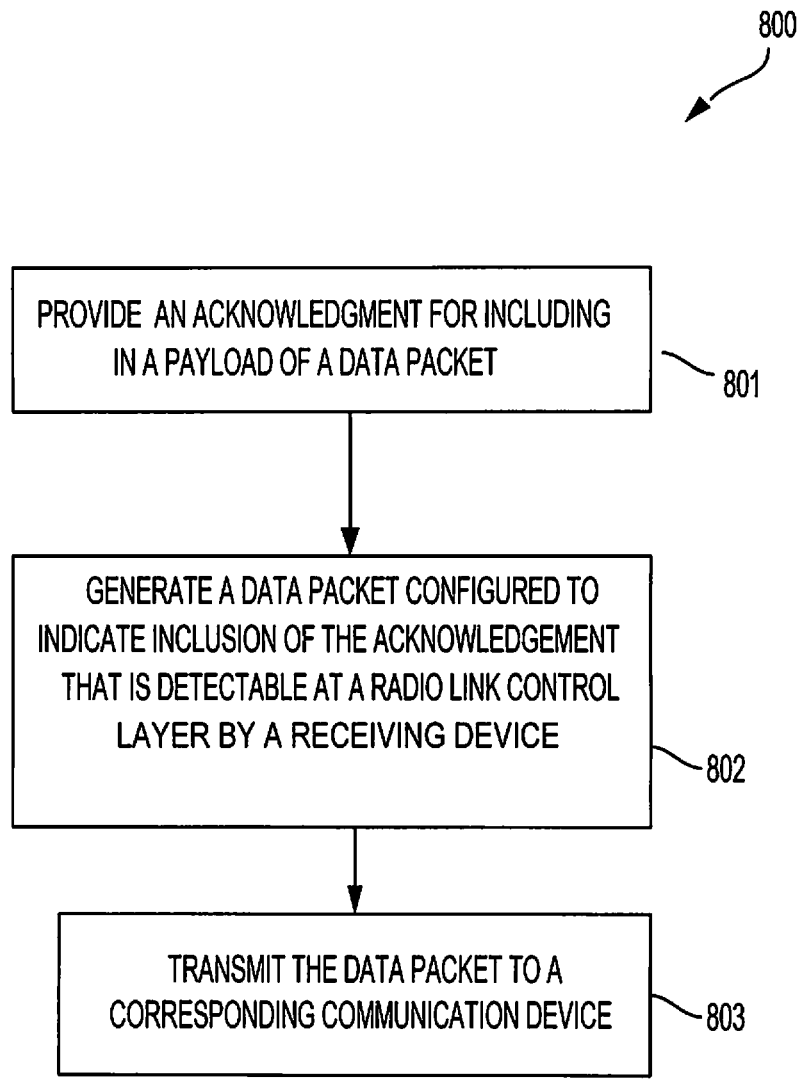
FIGS. 8 and 9 are flow diagrams illustrating operation providing communication of acknowledgments between communication devices according to concepts of the present disclosure.
Figure 9:
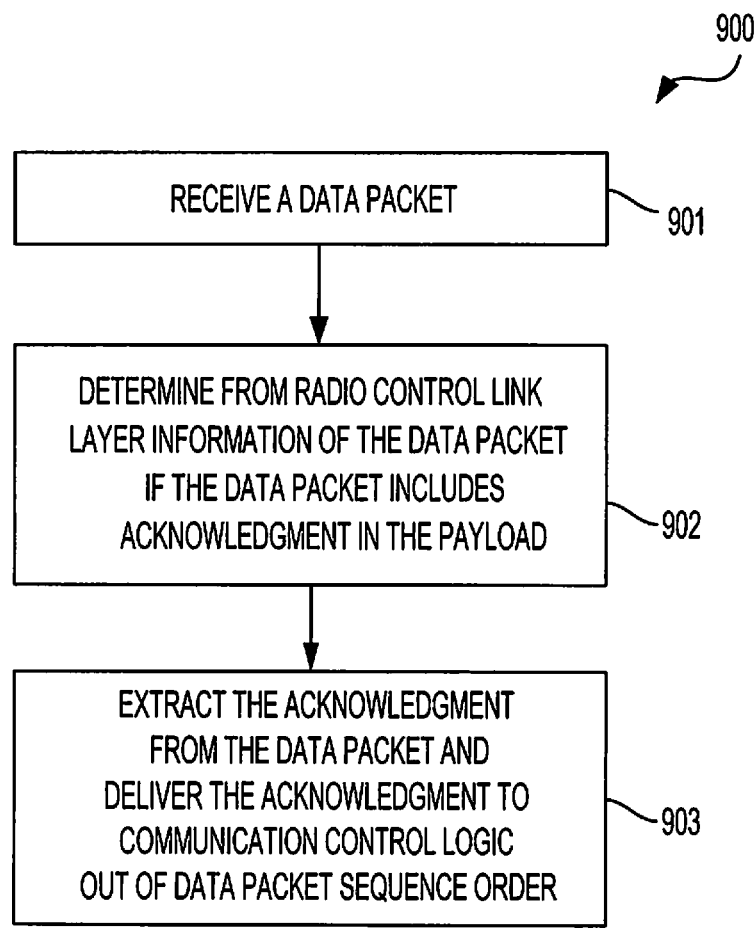

Operation of some embodiments configured to provide ACKs of an upper layer data protocol detectable in the RLC layer in accordance with the foregoing concepts is illustrated in FIGS. 8 and 9. In particular, FIG. 8 shows operation providing communication of acknowledgments between communication devices by a transmitting device while FIG. 9 shows operation providing communication of acknowledgements between communication devices by a receiving device.

FIG. 8 shows an embodiment of flow 800 providing communication of acknowledgments between communication devices by a device transmitting acknowledgments (e.g., UE 115 in an uplink or gNB 105 in a downlink). In operation according to flow 800 of the embodiment illustrated in FIG. 8, a first communication device (e.g., UE 115 operating to acknowledge data communication from gNB 105 or gNB 105 operating to acknowledge data communication from UE 115) provides an acknowledgment (e.g., one or more ACKs) for including in a payload portion of a data packet configured to communicate one or more ACKs detectable in the RLC layer at block 801. Correspondingly, at block 802 of the illustrated embodiment, the first communication device operates to generate a data packet including the acknowledgement as payload therein. The data packet generated by the first communication device at block 802 comprises a data packet configured for a communication device receiving the data packet to detect the inclusion of the ACK in the RLC layer. For example, RLC level logic of the first communication device (e.g., logic of controller/processor 280 of UE 115 or logic of controller/processor 240 of gNB 105) may operate to indicate the transmission of the ACK within the data packet by including a reserved value (e.g., a reserved LI value, a reserved extension value, etc.) in a predetermined field (e.g., a LI field, an extension field, etc.) of a header of the data packet to indicate that the data packet comprises the ACK. Additionally or alternatively, RLC level logic of the first communication device may operate to indicate the transmission of the ACK within the data packet by including the ACK within reserved bytes of the data packet for transmission of the data packet in accordance with a special grant. RLC level logic of the first communication device may additionally or alternatively operate to indicate the transmission of the ACK within the data packet by including the ACK within a data packet for transmission using a special logical channel or radio bearer channel. The data packet is transmitted by the first communication device to a second communication device at block 803 of the illustrated embodiment of flow 800. The data packet may be transmitted in accordance with a transmission grant reserving a portion of the transmission grant capacity for transmission of acknowledgments and/or via a special or reserved bearer channel.

FIG. 9 shows an embodiment of flow 900 providing communication of acknowledgements between communication devices by a device receiving acknowledgments (e.g., UE 115 in a downlink or gNB 105 in an uplink). In operation according to flow 900 of the embodiment illustrated in FIG. 9, a first communication device (e.g., UE 115 operating to transmit data to gNB 105 in an acknowledgment mode and thus receive acknowledgements from gNB 105 or gNB 105 operating to transmit data to UE 115 in an acknowledgment mode and thus receive acknowledgments from UE 115) receives a data packet (e.g., a control PDU or data PDU) at block 901. The data packet may be transmitted in accordance with a transmission grant reserving a portion of the transmission grant capacity for transmission of acknowledgments and/or via a special or reserved bearer channel. At block 902 of the illustrated embodiment, the first communication device determines from RLC layer information of the data packet if the data packet includes an acknowledgment (e.g., one or more ACKs) in a payload portion thereof. For example, RLC level logic of the first communication device (e.g., logic of controller/processor 280 of UE 115 or logic of controller/processor 240 of gNB 105) may operate to analyze a predetermined field in a header of the data packet for a reserved value to determine that the data packet includes an acknowledgement in the payload. Additionally or alternatively, RLC level logic of the first communication device may operate to analyze the data packet to determine that the data packet was transmitted in accordance with as special grant to determine that a data packet includes an acknowledgement in reserved bytes thereof. RLC level logic of the first communication device may additionally or alternatively operate to analyze the data packet to determine that the data packet was transmitted via a special or reserved bearer channel and includes an acknowledgment in the payload. The acknowledgment is extracted from the data packet and delivered to communication control logic of the first communication device out of data packet sequence order at block 903 of the illustrated embodiment of flow 900.

As can be appreciated from the foregoing discussion of various embodiments, in operation in accordance with concepts herein ACKs may be detected at the RLC layer and can be extracted and delivered to upper layers without waiting for all the in-sequence PDUs to be received or processed. For example, a device receiving ACKs transmitted according to embodiments herein, may identify a PDU as including one or more ACK upon decoding/deciphering the received RLC PDU, such as by detecting a special LI or extension field or by receiving the ACK via a special bearer channel, whereby the TCP ACK(s) may be extracted and delivered to upper layers without waiting for all the in-sequence PDUs to be received or processed. Accordingly, ACK PDUs may be delivered immediately and the ACKs extracted from the PDU without waiting for all in-sequence PDUs.

It should be appreciated that, PDUs utilized to transmit ACKs according to the foregoing embodiments may comprise control PDUs or data PDUs. A control PDU may be provided with a higher priority that either a retransmission data PDU or a new data PDU, control PDUs and may be processed by a receiving communication device without any further delays. However, a control PDU typically has no confirmation associated therewith and thus a lost control PDU may result in a lost ACK. Embodiments utilizing special or reserved definitions of header or control bits to signal transmission of one or more acknowledgments facilitate processing of the ACKs without further delay while also providing confirmation with respect to PDU delivery.

If a TCP ACK is received as part of a previous PDU compared to a latest processed PDU (e.g., due to RLC level retransmissions), the receiving device modem may nevertheless operate to deliver the old TCP ACK PDU, wherein the out of order TCP ACK may be taken care by the receiver (e.g., using reordering logic, similar to that utilized in wired networks). In operation according to embodiments, during PDU retransmissions at RLC level (e.g., due to BLER at the RLC level), the transmitting device may update the latest TCP ACK payload into the retransmitted PDU.

It should be appreciated that, although exemplary implementations have been described above with reference to transmission of acknowledgments in an uplink, the concepts herein are applicable with respect to links in either or both directions (i.e., uplink and/or downlink). Accordingly, embodiments providing for one or more special definition of header and/or control bits (e.g., length indicator, extension field, etc.), special grants (e.g., a grant to carry PDUs, such as control PDUs and/or data PDUs, with one or more TCP ACKs), and/or one or more special logical channel/radio bearer (e.g., a logical channel having higher priority than regular data bearer traffic) to signal transmission of one or more ACKs for indicating delivery of acknowledgments, to expedite processing of the acknowledgments, etc. may be utilized with respect to uplink communication of acknowledgments, downlink communication of acknowledgements, and uplink and downlink communication of acknowledgments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for providing communication acknowledgments (ACKs) between a plurality of communication devices, the method comprising:
   receiving, by a first communication device of the plurality of communication devices, a data packet, wherein the data packet comprises a data packet of a sequence of data packets; and
   determining, by the first communication device from radio link control (RLC) layer information of the data packet, if the data packet comprises at least one ACK of an upper layer data protocol in a payload portion of the data packet.

2. The method of claim 1, further comprising:
   extracting, by the first communication device, the at least one ACK from the data packet; and
   delivering the extracted ACK to communication control logic of the first communication device out of order with respect to the sequence of data packets.

3. The method of claim 1, wherein the determining if the data packet comprises at least one ACK in the payload portion of the data packet comprises:
   detecting a reserved value in a header of the data packet, wherein the reserved value is selected from the group consisting of a reserved length indicator (LI) value and a reserved extension field value.

4. The method of claim 3, wherein the reserved value is the LI value and the at least one ACK is a single ACK disposed in the payload portion of the data packet to comprise a last byte of the payload portion, and wherein the reserved LI value is disposed in a last LI field of a header portion of the data packet.

5. The method of claim 3, wherein reserved value is the LI value and the at least one ACK includes two or more ACKs, and wherein the reserved LI value is disposed in a LI field followed by another LI field containing a length of one ACK of the two or more ACKs.

6. The method of claim 3, wherein the reserved value is the reserved extension field value and is disposed in an extension field corresponding to a length indicator field containing a length of an ACK of the at least one ACK.

7. The method of claim 1, wherein the determining if the data packet comprises at least one ACK in the payload portion of the data packet comprises:
   determining that the data packet was received via a reserved logical channel or a reserved radio bearer channel.

8. The method of claim 1, wherein the determining if the data packet comprises at least one ACK in the payload portion of the data packet comprises:
   determining that the data packet was transmitted in accordance with a special transmission grant having the at least one ACK in reserved bytes thereof, wherein the special transmission grant includes a reservation of at least a portion of a transmission capacity for transmission of ACKs from a larger total amount of transmission capacity granted to a second communication device of the plurality of communications devices by the special transmission grant, and wherein the data packet is transmitted using the transmission capacity reserved for transmission of ACKs in the special transmission grant.

9. An apparatus for providing communication acknowledgments (ACKs) between a plurality of communication devices, the apparatus comprising:
   at least one processor; and
   a memory coupled to the at least one processor, wherein the at least one processor is configured:
      to receive, at a first communication device of the plurality of communication devices, a data packet, wherein the data packet comprises a data packet of a sequence of data packets; and
      to determine from radio link control (RLC) layer information of the data packet if the data packet comprises at least one ACK of an upper layer data protocol in a payload portion of the data packet.

10. The apparatus of claim 9, wherein the at least one processor is configured:
   to extract the at least one ACK from the data packet; and
   to deliver the extracted ACK to communication control logic of the first communication device out of order with respect to the sequence of data packets.

11. The apparatus of claim 9, wherein the at least one processor configured to determine if the data packet comprises at least one ACK in the payload portion of the data packet is configured:
   to detect a reserved value in a header of the data packet, wherein the reserved value is selected from the group consisting of a reserved length indicator (LI) value and a reserved extension field value.

12. The apparatus of claim 11, wherein the reserved value is the LI value and the at least one ACK is a single ACK disposed in the payload portion of the data packet to comprise a last byte of the payload portion, and wherein the reserved LI value is disposed in a last LI field of a header portion of the data packet.

13. The apparatus of claim 11, wherein the reserved value is the LI value and the at least one ACK includes two or more ACKs, and wherein the reserved LI value is disposed in a LI field followed by another LI field containing a length of one ACK of the two or more ACKs.

14. The apparatus of claim 11, wherein the reserved value is the reserved extension field value and is disposed in an extension field corresponding to a length indicator field containing a length of an ACK of the at least one ACK.

15. The apparatus of claim 9, wherein the at least one processor configured to determine if the data packet comprises at least one ACK in the payload portion of the data packet is configured:
   to determine that the data packet was received via a reserved logical channel or a reserved radio bearer channel.

16. The apparatus of claim 9, wherein the at least one processor configured to determine if the data packet comprises at least one ACK in the payload portion of the data packet is configured:
   to determine that the data packet was transmitted in accordance with a special transmission grant having the at least one ACK in reserved bytes thereof, wherein the special transmission grant includes a reservation of at least a portion of a transmission capacity for transmission of ACKs from a larger total amount of transmission capacity granted to a second communication device of the plurality of communications devices by the special transmission grant, and wherein the data packet is transmitted using the transmission capacity reserved for transmission of ACKs in the special transmission grant.

17. A method for providing communication acknowledgments (ACKs) between a plurality of communication devices, the method comprising:
   providing, by a first communication device of the plurality of communication devices, at least one ACK of an upper layer data protocol for including in a payload portion of a data packet;
   generating, by the first communication device, the data packet including the at least one ACK and configured to indicate inclusion of the at least one ACK at a radio link control (RLC) layer; and
   transmitting, by the first communication device, the data packet, wherein the data packet comprises a data packet of a sequence of data packets.

18. The method of claim 17, wherein the data packet is configured to indicate inclusion of the at least one ACK at the RLC layer by including a reserved value in a header of the data packet, wherein the reserved value is selected from the group consisting of a reserved length indicator (LI) value and a reserved extension field value.

19. The method of claim 18, wherein the reserved value comprises the reserved LI value and the at least one ACK is a single ACK disposed to comprise a last byte of the payload portion, and wherein the reserved LI value is disposed in a last LI field of the header portion of the data packet.

20. The method of claim 18, wherein the reserved value comprises the reserved LI value and the at least one ACK includes two or more ACKs, and wherein the reserved LI value is disposed in a LI field that is followed by another LI field containing a length of one ACK of the two or more ACKs.

21. The method of claim 17, wherein the reserved value comprises the reserved extension field value disposed in an extension field of the header of the data packet.

22. The method of claim 17, wherein the data packet is configured to indicate inclusion of the at least one ACK at the RLC layer by configuring the data packet for transmission via a reserved logical channel or a reserved radio bearer channel established between the first communication device and a second communication device of the plurality of communication devices.

23. The method of claim 17, wherein the data packet is configured to indicate inclusion of the at least one ACK at the RLC layer by configuring the data packet for transmission in association with a special transmission grant that includes a reservation of at least a portion of a transmission capacity for transmission of ACKs from a larger total amount of transmission capacity granted to the first communication device by the special transmission grant and including the at least one ACK in reserved bytes of the data packet designated by the special transmission grant.

24. An apparatus for providing communication acknowledgments (ACKs) between a plurality of communication devices, the apparatus comprising:
   at least one processor; and
   a memory coupled to the at least one processor, wherein the at least one processor is configured:
      to provide, at a first communication device of the plurality of communication devices, at least one ACK of an upper layer data protocol for including in a payload portion of a data packet;
      to generate, at the first communication device, the data packet including the at least one ACK and configured to indicate inclusion of the at least one ACK at a radio link control (RLC) layer; and to transmit the data packet, wherein the data packet comprises a data packet of a sequence of data packets.

25. The apparatus of claim 24, wherein the data packet is configured to indicate inclusion of the at least one ACK at the RLC layer by including a reserved value in a header of the data packet, wherein the reserved value is selected from the group consisting of a reserved length indicator (LI) value and a reserved extension field value.

26. The apparatus of claim 25, wherein the reserved value comprises the reserved LI value and the at least one ACK is a single ACK disposed to comprise a last byte of the payload portion, and wherein the reserved LI value is disposed in a last LI field of the header of the data packet.

27. The apparatus of claim 25, wherein the reserved value comprises the reserved LI value and the at least one ACK includes two or more ACKs, and wherein the reserved LI value is disposed in a LI field that is followed by another LI field containing a length of one ACK of the two or more ACKs.

28. The apparatus of claim 24, wherein the reserved value comprises the reserved extension field value disposed in an extension field of the header of the data packet.

29. The apparatus of claim 24, wherein the data packet is configured to indicate inclusion of the at least one ACK at the RLC layer by configuring the data packet for transmission via a reserved logical channel or a reserved radio bearer channel established between the first communication device and a second communication device of the plurality of communication devices.

30. The apparatus of claim 24, wherein the data packet is configured to indicate inclusion of the at least one ACK at the RLC layer by configuring the data packet for transmission in association with a special transmission grant that includes a reservation of at least a portion of a transmission capacity for transmission of ACKs from a larger total amount of transmission capacity granted to the first communication device by the special transmission grant and including the at least one ACK in reserved bytes of the data packet designated by the special transmission grant.

* * * * *